United States Patent [19]

Mori

[11] Patent Number: 4,589,293

[45] Date of Patent: May 20, 1986

[54] EMERGENCY PTO DRIVING UNIT

[75] Inventor: Mituyoshi Mori, Hirakatashi, Japan

[73] Assignee: Kabushiki Kaisha Daikin Seisakusho, Japan

[21] Appl. No.: 617,862

[22] Filed: Jun. 6, 1984

[30] Foreign Application Priority Data

Jun. 7, 1983 [JP] Japan .................. 58-102284

[51] Int. Cl.$^4$ ............ F16H 37/00; B62D 5/00; B60K 17/28; B60K 25/00
[52] U.S. Cl. .................... 74/15.6; 180/133; 180/53.4; 192/91 A
[58] Field of Search ............. 74/15.4, 15.69, 15.6; 180/133, 53.4; 192/91 A, 85 A, 67 R

[56] References Cited

U.S. PATENT DOCUMENTS

| | | | |
|---|---|---|---|
| 2,742,991 | 4/1956 | Gilbert et al. | 192/91 A |
| 3,004,438 | 10/1961 | Funk et al. | 192/91 A |
| 3,522,861 | 8/1970 | Middlesworth et al. | 180/53.4 |
| 3,696,613 | 10/1972 | Goodale | 180/133 |
| 3,800,900 | 4/1974 | Goodale | 180/133 |
| 3,975,908 | 8/1976 | Smith et al. | 180/133 |

OTHER PUBLICATIONS

"Emergency Steering—Which System is Best?", *SAE Tech. Paper Series* 810988, R. L. Guenther, Sep. 1981.

*Primary Examiner*—Lawrence J. Staab
*Assistant Examiner*—Michael D. Bednarek
*Attorney, Agent, or Firm*—Armstrong, Nikaido, Marmelstein & Kubovcik

[57] ABSTRACT

An emergency PTO driving unit including an emergency PTO pump being normally equipped to a vehicle for an industrial machinery, said emergency PTO pump being interconnected through a clutch unit to an axle to utilize rotation of a wheel as a power source for driving the pump, said clutch unit being so composed that the clutch is brought into a "disengaged" state by means of a hydraulic pressure supplied from a proper hydraulic pump driven by an engine when the engine is running, and the clutch is brought into an "engaged" state by means of a spring means when the engine is stopped.

7 Claims, 2 Drawing Figures

EMERGENCY PTO DRIVING UNIT

BACKGROUND OF THE INVENTION

This invention relates mainly to an emergency PTO driving unit of a vehicle for industrial machinery.

Generally, this kind of driving unit is used for actuating the vehicle power steering, etc., in an emergency such as engine trouble etc., and rotation of a wheel, or a battery, is utilized as the driving units power source. Namely, in a case such as when a vehicle is towed by another vehicle due to engine trouble, etc., this driving unit allows the towed vehicle's power steering to function normally.

An emergency PTO pump has conventionally been equipped as the PTO driving unit, and the following installing methods have been employed.

The first method is that in which the emergency PTO pump is normally equipped on a vehicle and the pump is always actuated by utilizing rotation of a wheel even in case of no emergency. However, in such a construction, power loss will be generated during normal running and troubles could occur in the PTO pump before an emergency actually arises.

The second method is that in which the PTO pump is installed when an emergency of a vehicle arises. In this construction, however, a great deal of labour is required in installing the pump. Further, in a case such as when a vehicle breaks down on a down-slope, it would continue running with its steering wheel inoperable.

The third method is that in which a vehicle is equipped with a motor driven by a battery mounted thereon and the PTO pump is actuated by that motor. In this construction, however, the pump can be used for no more than the service life of the battery.

An object of this invention is to overcome the disadvantages of the above conventional embodiments. In order to accomplish this object, in this invention, an emergency PTO driving unit includes an emergency PTO pump which is normally equipped on a vehicle for industrial machinery, said emergency PTO pump is interconnected through a clutch unit to an axle to utilize rotation of a wheel as a power source for driving the pump, and said clutch unit is so composed that the clutch is brought into a "disengaged" state by means of a hydraulic pressure supplied from a proper hydraulic pump driven by an engine when the engine is running, and the clutch is brought into an "engaged" state by means of a spring means when the engine is stopped.

DETAILED DESCRIPTION OF THE INVENTION

Figure 1:
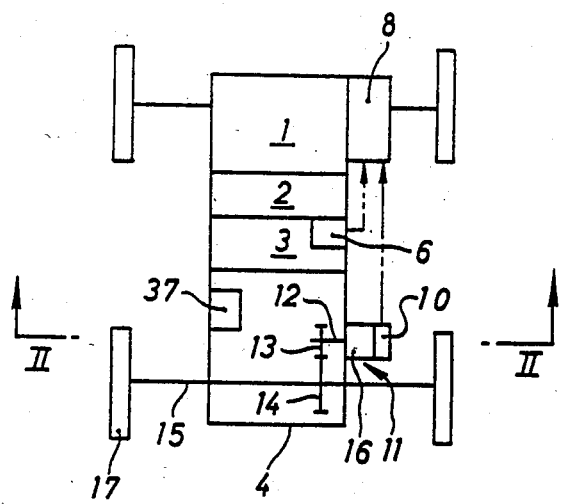
FIG. 1 is a schematic plan diagram of a vehicle for industrial machinery equipped with an emergency PTO driving unit according to this invention.

In FIG. 1, reference numeral 1 an engine, 2 a torque converter, 3 is a travelling hydraulic clutch, and 4 designates a transmission case. A power steering hydraulic pump 6 is connected to the torque converter 2, and oil is fed from said hydraulic pump 6 to a power steering device 8 during running of the engine.

An emergency PTO pump 10 is secured to the transmission case 4, and this PTO pump 10 is interconnected through a clutch unit 11, a pump driving shaft 12, and gears 13, 14 to a rear axle 15, thus utilizing rotation of a rear wheel 17 as its driving power source. A delivery port of the PTO pump 10 is connected to the power steering unit 8 so that oil can be fed to the power steering unit 8 through changeover of the clutch unit 11 only when the engine is stopped.

Figure 2:
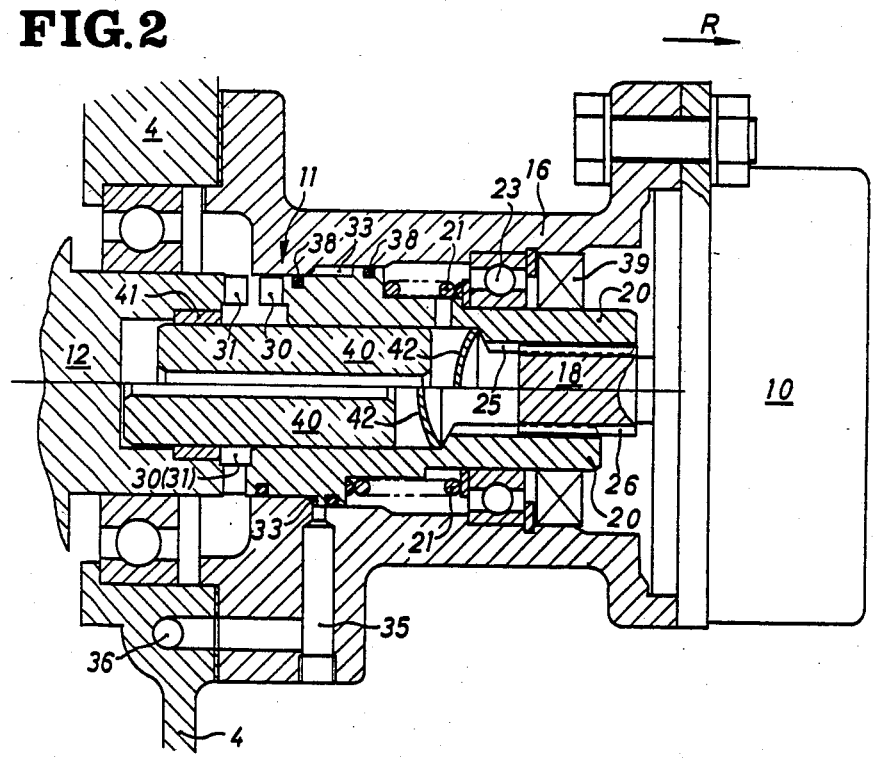
FIG. 2 is an enlarged detailed sectional view taken on the line II—II of FIG. 1.

FIG. 2 is an enlarged detailed sectional view taken on the line II—II of FIG. 1, in which the upper half shows conditions at the time when the clutch is disengaged (during engine running) and the lower half shows those at the time when the clutch is engaged (during engine stopping). In FIG. 2, the emergency PTO pump 10 is secured through a pump mounting bed 16 to the transmission case 4. The clutch unit 11 is incorporated in the pump mounting bed 16 to connect the pump driving shaft 12 and a pump input shaft 18 in such a manner as for freely engaging and disengaging them.

The clutch unit 11 comprises a cylindrical shaft 20, a coil spring 21, etc.. The cylindrical shaft 20 fits into an inner peripheral surface of the mounting bed 16 through a bearing 23, etc.. freely rotatably and slidingly in the axial direction, and is urged toward the side of the driving shaft 12 (direction opposite to the arrow R) by means of the spring 21. An internal spline 25 is formed on a portion of the cylindrical shaft 20 at the side of the pump 10 (direction of the arrow R), meshing with an external spline 26 of the pump input shaft 18 freely slidingly in the axial direction. A clutch claw 30 is formed on an end face of the cylindrical shaft 20 at the side opposite to the arrow R, engaging and disengaging freely with a clutch claw 31 of the driving shaft 12. Namely, both clutch claws 30, 31 disengage each other as shown by the upper half of FIG. 2 when the cylindrical shaft 20 is shifted in the direction of the arrow R, and both clutch claws 30, 31 engage each other as shown by the lower half of FIG. 2 when shaft 20 is shifted in the direction opposite to the arrow R.

An annular oil chamber 33 is formed between an outer peripheral surface portion of the cylindrical shaft 20 and an inner peripheral surface portion of the mounting bed 16, and this oil chamber 33 is interconnected through an oil passage 35 in the mounting bed 16 to an oil passage 36 of the transmission case 4, and the oil passage 36 is interconnected, for example, to a hydraulic pump 37 for the hydraulic clutch 3 of FIG. 1. The hydraulic pump 37 for the hydraulic clutch is always driven by the engine 1 during running of the engine to feed oil to the oil passage 36 (FIG. 2). Incidentally, reference numerals in FIG. 2, 38 designate seal rings, 39 an oil seal and 42 a plug. Further, 40 designates an aligning guide cylinder which is secured to an inner peripheral surface of the cylindrical shaft 20 and at the same time fits freely rotatably and slidingly in the axial direction through a metal bearing 41 in an inner peripheral surface of the driving shaft 12.

Functioning of this pump will be described hereunder. Since oil is supplied under pressure into the annular oil chamber 33 during engine running, the cylindrical shaft 20 moves in the direction of the arrow R due to hydraulic pressure in the oil chamber 33 acting against the spring 21, and the clutch unit 11 is kept disengaged as shown by the upper half of FIG. 2. In this instance, oil is supplied from the power steering hydraulic pump 6 to the power steering unit 8 (FIG. 1).

In the event the engine 1 stops at the time of an emergency such as engine trouble, etc., the hydraulic pump 37 for the hydraulic clutch also stops, lowering the hydraulic pressure in the annular oil chamber 33 of FIG. 2, and the cylindrical shaft 20 moves in the direction opposite to the arrow R due to the urging resilient force of the spring 21 as shown by the lower half of FIG. 2 to cause engagement between both clutch claws 30, 31. Namely, the clutch unit 11 is automatically brought into an "engaged" state in this instance. When a broken down vehicle is hauled or permitted to run freely by gravity on a down slope under the above condition, the emergency PTO pump 10 is driven by rotation of the axle 15 to supply oil to the power steering unit 8, thus making the steering unit operable.

Incidentally, the power steering hydraulic pump 6 of FIG. 1, or a hydraulic pump for feeding lubricating oil, for example, may be utilized in this invention as a hydraulic power source to keep the clutch unit 11 disengaged besides the hydraulic pump 37 for the hydraulic clutch shown in the above embodiment. Namely, any hydraulic pump will do if only it is driven by the engine 1 during running of the engine.

As described above, the following advantages will become obtainable according to the present invention.

(1) Since the emergency PTO pump 10 is normally equipped on a vehicle, the pump installation work is not required when an emergency arises.

(2) Since the emergency PTO pump 10 is interconnected to the axle 15 to utilize the rotation of the wheel as the power source for driving the pump, the construction is economical as compared with a battery, etc., for use as the power source and there is no possibility of exhaustion of energy.

(3) The emergency PTO pump 10 is interconnected through the clutch unit 11 to the axle 15 and the clutch is brought into a "disengaged" state by means of a hydraulic pressure from a proper hydraulic pump (for instance, the hydraulic pump 37 for hydraulic clutch 3) driven by the engine 1, so that the emergency PTO pump 10 stops to prevent power from being lost during running of the engine. Further, there is no possibility of failure of the PTO pump 10. On the contrary, the clutch is automatically brought into an "engaged" state by means of a spring (the spring 21) during stopping of the engine, so that the power steering can be quickly operated without an additional changeover operation of the clutch when an emergency arises.

Moreover, any spring such as a leaf spring, a coned disc spring, etc., may be utilized as the spring means in addition to the coil spring 21 shown in the embodiment. Furthermore, rotation of a front wheel may be utilized as the power source for driving the pump.

What is claimed is:

1. An emergency PTO driving unit for an industrial machinery vehicle having a hydraulically operated power steering unit supplied with operating hydraulic pressure from an engine-driven hydraulic pump during running of an engine of said vehicle, said emergency PTO driving unit being operable to supply emergency hydraulic pressure to said power steering unit under conditions of traveling of said vehicle with said engine stopped, said emergency PTO driving unit comprising:
 a PTO pump having a delivery port connected to supply emergency hydraulic pressure to said power steering unit;
 a pump driving shaft for driving said emergency PTO pump and in driven connection with a wheel axle of said vehicle; and
 a hydraulically-operated PTO pump clutch unit for selectively mechanically coupling said PTO pump with said pump driving shaft, said PTO pump clutch unit being in communication with said engine-driven hydraulic pump and maintained in a disengaged state by said operating hydraulic pressure supplied from said engine-driven hydraulic pump during running of said engine such that said PTO pump is not driven by said pump driving shaft, said PTO pump clutch having spring means acting in opposition to said operating hydraulic pressure for engaging said PTO pump clutch unit when supplying of said operating hydraulic pressure ceases upon stopping of said engine, such that said PTO pump is mechanically coupled with said pump driving shaft;
 whereby, under traveling of said vehicle with said engine stopped, said PTO pump is driven via said wheel axle to supply said emergency hydraulic pressure to said power steering unit.

2. An emergency PTO driving unit as set forth in claim 1, wherein said engine-driven hydraulic pump is a hydraulic pump for operating a hydraulic traveling clutch of a transmission of said vehicle.

3. An emergency PTO driving unit as set forth in claim 1, wherein said PTO pump clutch unit is provided with a splined cylindrical shaft acted upon by said spring means and fitted freely slidingly in an axial direction thereof on a pump input shaft of said PTO pump, said cylindrical shaft and said pump driving shaft being axially aligned with one another and each having respective facing ends thereof provided with clutch claws;
 whereby, under conditions of running of said engine and supplying of said operating hydraulic pressure to said PTO clutch unit from said engine-driven hydraulic pump, said spline cylindrical shaft is maintained spaced apart from said pump driving shaft such that the respective clutch claws thereof are disengaged from each other, and upon stopping of said engine and ceasing of supplying of said operating hydraulic to said PTO clutch unit, said cylindrical shaft is urged axially by said spring means toward said pump driving shaft to engage said respective clutch claws thereof with one another so that said PTO clutch becomes engaged.

4. An emergency PTO driving unit as set forth in claim 3 wherein said spring means is a coil spring.

5. An emergency PTO driving unit as set forth in claim 3, wherein said PTO pump is provided in a pump mounting bed secured to a transmission case, said cylindrical shaft is fitted in an inner peripheral surface of said pump mounting bed, and an annular oil chamber fluidly interconnected to said engine-driven hydraulic pump is formed between an outer peripheral surface of said cylindrical shaft and said inner peripheral surface of said pump mounting bed.

6. An emergency PTO driving unit as set forth in any of claims 1, 3, 4 or 5, wherein said engine-driven hydraulic pump is a power steering pump of said vehicle.

7. An emergency PTO driving unit as set forth in claim 1 wherein said pump driving shaft is provided at an end thereof opposite said PTO clutch unit with a first gear drivingly engaged with a second gear provided on said wheel axle of said vehicle.

* * * * *